US011989589B2

(12) United States Patent
Kvochko (10) Patent No.: US 11,989,589 B2
(45) Date of Patent: May 21, 2024

(54) MULTI-DIMENSIONAL MODELING OF RESOURCES FOR INTERACTION SYSTEMS

(71) Applicant: BANK OF AMERICA CORPORATION, Charlotte, NC (US)

(72) Inventor: Elena Kvochko, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 755 days.

(21) Appl. No.: 16/876,183

(22) Filed: May 18, 2020

(65) Prior Publication Data

US 2021/0357262 A1 Nov. 18, 2021

(51) Int. Cl.
*G06F 9/50* (2006.01)
*G06N 5/01* (2023.01)
*G06N 5/025* (2023.01)
*H04L 9/32* (2006.01)

(52) U.S. Cl.
CPC ............ *G06F 9/5027* (2013.01); *G06N 5/01* (2023.01); *G06N 5/025* (2013.01); *H04L 9/3218* (2013.01)

(58) Field of Classification Search
CPC ............ G06Q 30/018; G06Q 30/0185; G06Q 20/4016; G06Q 20/401; G06Q 20/40; G06Q 20/42; H04L 63/10; H04L 63/102; H04L 63/105
See application file for complete search history.

(56) References Cited

U.S. PATENT DOCUMENTS

| | | | |
|---|---|---|---|
| 7,620,592 B2 | 11/2009 | OMara et al. | |
| 7,930,753 B2 | 4/2011 | Mellinger et al. | |
| 8,175,908 B1 | 5/2012 | Anderson | |
| 8,626,663 B2 | 1/2014 | Nightengale et al. | |
| 9,367,844 B1 * | 6/2016 | Hu | G06Q 20/4016 |
| 10,002,358 B1 * | 6/2018 | George | G06Q 30/02 |
| 10,482,437 B2 * | 11/2019 | Groarke | G06Q 20/4016 |
| 10,552,895 B2 * | 2/2020 | Banhidy | G06Q 30/0635 |

(Continued)

FOREIGN PATENT DOCUMENTS

WO WO-2019159083 A1 * 8/2019 ......... G06Q 30/0282

*Primary Examiner* — Tae K Kim
(74) *Attorney, Agent, or Firm* — Moore & Van Allen PLLC; Nicholas C. Russell (57) ABSTRACT

A system that provides an exchange platform for resource interaction processors that qualify under a modelling process. The platform is continuously updated with information regarding the resource interaction processors with both private and public information. The platform includes regulatory and other rules dictating interaction parameters associated with the resource interaction processors. The platform provides a viability metric of the resource interaction processors for providing resource interaction processor services to the resource interaction processors. Authorized entities may access and view the merchant exchange platform to gather information about the resource interaction processors for use in determining whether to provide services. Furthermore, the platform provides information regarding regulatory oversight for the specific resource interaction processors, allows for the establishment of a dialogue between resource interaction processors and service providers, provides ongoing review of resource interaction processors in real-time data upgrading in an encrypted environment.

17 Claims, 7 Drawing Sheets

(56) References Cited

U.S. PATENT DOCUMENTS

| | | | |
|---|---|---|---|
| 11,430,070 B1* | 8/2022 | Mullins | G06Q 20/204 |
| 2002/0065695 A1* | 5/2002 | Francoeur | G06Q 20/382 |
| | | | 705/64 |
| 2009/0089074 A1* | 4/2009 | Schoenberg | G16H 70/00 |
| | | | 705/2 |
| 2015/0095191 A1* | 4/2015 | Hu | G06Q 30/0613 |
| | | | 705/26.41 |
| 2015/0242857 A1* | 8/2015 | Wilcox | G06Q 20/4016 |
| | | | 705/44 |
| 2016/0034898 A1* | 2/2016 | Ghosh | G06Q 20/4016 |
| | | | 705/39 |
| 2016/0189150 A1* | 6/2016 | Ahuja | G06Q 20/40145 |
| | | | 705/44 |
| 2016/0260102 A1 | 9/2016 | Nightengale et al. | |
| 2016/0267406 A1* | 9/2016 | Bodo | G06Q 10/0635 |
| 2017/0132636 A1* | 5/2017 | Caldera | G06Q 20/4016 |
| 2018/0218422 A1* | 8/2018 | Gungor | G06F 16/9535 |
| 2019/0012670 A1* | 1/2019 | Pishe | G06Q 30/0207 |
| 2019/0087822 A1* | 3/2019 | Vasu | G06Q 20/3276 |
| 2019/0311094 A1* | 10/2019 | Brannon | G06F 21/316 |
| 2019/0340606 A1* | 11/2019 | Olenoski | G06Q 20/3224 |
| 2020/0051049 A1* | 2/2020 | Groarke | G06Q 20/12 |
| 2020/0074562 A1* | 3/2020 | Johnson | G06F 16/23 |
| 2020/0217150 A1* | 7/2020 | Brutaru | E21B 15/04 |
| 2020/0219098 A1* | 7/2020 | Prabhu | G06Q 30/0226 |
| 2020/0250676 A1* | 8/2020 | Sierra | H04L 9/0637 |
| 2020/0327548 A1* | 10/2020 | Hartard | G06Q 20/12 |
| 2021/0366586 A1* | 11/2021 | Ryan | G06Q 20/3224 |

* cited by examiner

MULTI-DIMENSIONAL MODELING OF RESOURCES FOR INTERACTION SYSTEMS

BACKGROUND

Typically, an entity providing resource interaction services is restricted as to which resource interaction processors they can provide such services to. These restrictions may be both internal and external (e.g., government-imposed restrictions or the like). Such restrictions act as an impediment to new resource interaction processors and/or emerging types of resource interactions.

To compound the problem information and data associated with new resource interaction processors and/or emerging types of resource interactions may be scarce and/or difficult to obtain, especially in the instance in which the new resource interaction processor and/or type of resource interaction is one deemed to fall into a high-misappropriation category.

Therefore, a need exists to develop systems, methods, computer program products and the like which address the aforementioned problems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing an exchange platform for merchants that qualify under a modelling process. The platform is continuously updated with information regarding the merchant with both private and public information. The platform includes regulatory and other rules dictating business parameters associated with the merchant. The platform may develop various scoring methods associated with a merchant for scoring the merchant and merchant category for possible resource interaction processor services deployment from a financial institution or other entities. The platform provides a rating or viability metric of the merchant for providing resource interaction processor services to the merchant. Other entities may access and view the merchant exchange platform to gather information about the merchant for use in determining whether to provide services. Furthermore, the platform provides information regarding regulatory oversight for the specific merchant, allows for the establishment of a dialogue between merchant and service providers, provides ongoing review of merchant scoring, provides zero knowledge search capabilities, and the like within the platform.

The merchant exchange platform is provided with information from a multi-dimensional modeling of the merchants that determines the viability of deployment of resource interaction services. The system leverages data captured from various sources along with internal and external rules and regulations applicable to the merchant to provide a model for the merchant, i.e., determine whether the merchant meets requirements for resource interactions services.

In the event that the merchant is determined to be viable, resource interactions services are deployed to the resource interaction processor.

Embodiments of the invention are directed to a system, method, or computer program product for a multi-dimensional platform generation for resource interaction processors, the invention comprising: capturing, from a plurality of data sources, first data associated with a plurality of resource interaction processors; aggregating the captured first data; implementing a heuristics engine to determine, based at least on the retrieved internal and external rules and regulations data and the received aggregated and filtered first data, whether the one of the plurality of resource interaction processors is a viable candidate for deploying resource interaction processor services, wherein the determining generates a model for resource interaction processors viability; storing the first data, the aggregated captured first data, second data, aggregated captured second data, and the model associated with the plurality of resource interaction processors as resource interaction processor information; encrypting the resource interaction processor information for authorized user access; and presenting the encrypted resource interaction processor information to authorized users for resource interaction processor service deployment.

In some embodiments, the invention further comprises providing a dynamic viability metric for the plurality of resource interaction processors.

In some embodiments, the invention further comprises establishing of a dialogue between authorized user and the plurality of resource interaction providers via a distributed computer network.

In some embodiments, the invention further comprises a model generating sub-system configure to: receive, from the resource interaction processor, aggregated and filtered first data associated with the one of the plurality of resource interaction processors; and access a resource interaction processor database to retrieve internal and external rules and regulations data associated with one of the plurality of resource interaction processors to implement the heuristics engine.

In some embodiments, the invention further comprises filtering the captured and aggregated first data by analyzing a value of first datum in comparison to trust levels associated with each of the data sources and removing at least a portion of the first data determined to have the value below a predetermined one of the trust levels.

In some embodiments, the invention further comprises in response to determining that the one of the plurality of resource interaction processors is the viable candidate, deploy one or more resource interaction processor services to the one of the plurality of resource interaction processors.

In some embodiments, the invention further comprises: capturing, from the plurality of data sources, second data associated with one of a plurality of resource interaction processor types; aggregating the captured second data; and filtering the captured and aggregated second data by analyzing a value of each second datum in comparison to trust levels associated with each of the data sources and removing at least a portion of the second data determined to have the value below a predetermined one of the trust levels.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for an exchange platform for merchants that qualify under a modelling process. The platform is continuously updated with information regarding the merchant with both private and public information. The platform includes regulatory and other rules dictating business parameters associated with the merchant. The platform may develop various scoring methods associated with a merchant for scoring the merchant and merchant category for possible resource interaction processor services deployment from a financial institution or other entities. The platform provides a rating or viability metric of the merchant for providing resource interaction processor services to the merchant. Other entities may access and view the merchant exchange platform to gather information about the merchant for use in determining whether to provide services. Furthermore, the platform provides information regarding regulatory oversight for the specific merchant, allows for the establishment of a dialogue between merchant and service providers, provides ongoing review of merchant scoring, provides zero knowledge search capabilities, and the like within the platform.

The platform may include a multi-dimensional modeling of resource interaction processors for determining the viability of deployment of resource interaction services. The system leverages data captured from various sources along with internal and external rules and regulations applicable to a resource interaction processor to provide a model for the resource interaction processor, i.e., determine whether the resource interaction processor meets requirements for resource interactions services. In the event that the resource interaction processor is determined to be viable, resource interactions services are deployed to the resource interaction processor.

In specific embodiments of the invention the resource interaction processor is a merchant or merchant system that conducts resource interactions. Resource interactions may include any financial transactions between a customer and the merchant or the merchant and vendors. More specifically, the merchant may be a new or emerging merchant, which may be participating in a new or emerging industry. The new and/or emerging merchant may desire resource interaction services, e.g., merchant services, to conduct their business. Resource interaction services, as used herein may refer to merchant services such as financial services that allow a business to accept credit/debit card transactions using order or Point-of-Sale (POS) systems/devices (i.e., payment processing or the like).

Many rules and regulations are in place, which place stringent controls and restrictions on financial institutions ability to provide merchant services to certain types of merchants, such as merchants that conduct business in areas deemed to be high-misappropriation level (e.g., potential for misappropriation, or otherwise associated with illegal activity). In addition, these rules and regulations vary depending upon where the business is located or otherwise conducts business (e.g., which country and/or state/region the business is located in or conducts business in). Moreover, due to the nature of the threat posed by these high-misappropriation businesses, many of these rules and regulations are deemed to be fluid, in that, the rules and regulations may be dynamically revised and/or have yet to be developed and/or enacted.

Entities that desire to provide resource interaction services (e.g., merchant services), such as financial institutions or the like to such new and/or emerging resource interaction processors (e.g., merchants) may have little knowledge or background on such merchants. Such is especially the case, if the merchant does business in a known high-misappropriation industry.

As such, the present invention provides for an automated resource interaction processor (e.g., merchant) platform that allows an entity providing resource interaction services (e.g., merchant services) to review the resource interaction processor history, category, and the like to determine whether the merchant is a viable candidate for providing resource interaction services (e.g., merchant services). The system takes a multi-dimensional approach in modeling the resource interaction processors, performs sentiment analysis, provides real-time updates of data, provides stakeholder access to data, generates time dependent resource interaction processor reports, and provides a transactional database for entities to review and create a dialogue between the resource interaction processor and the entity for providing resource interaction services to the resource interaction processor. The platform may include public and private data for authorized user review. The authorized user may be a financial institution, stakeholder, or the like providing resource interactions services to one or more resource interaction processors. In this way, the platform is encrypted via zero based knowledge encryption.

This multi-dimensional approach serves to learn as much as possible about the resource interaction processor through capturing information related to the resource interaction processor from both conventional and non-conventional/ alternative data sources. Once the data has been captured and properly filtered to eliminate data of low value from untrusted sources, the data, along with currently applicable internal and external rules and regulations, is used to generate a model for the resource interaction processor. The model provides an indication as to whether the resource interaction processor/merchant is a viable, or otherwise acceptable, candidate for providing merchant services to (e.g., the merchant is conducting a legitimate/legal business that adheres to current rules and regulations or the like).

Once the model has been generated, the system compiles all of the gathered data and the model and compiles this data on a platform in an encrypted searchable format for user visualization for future resource interaction processor service providing.

Figure 1:
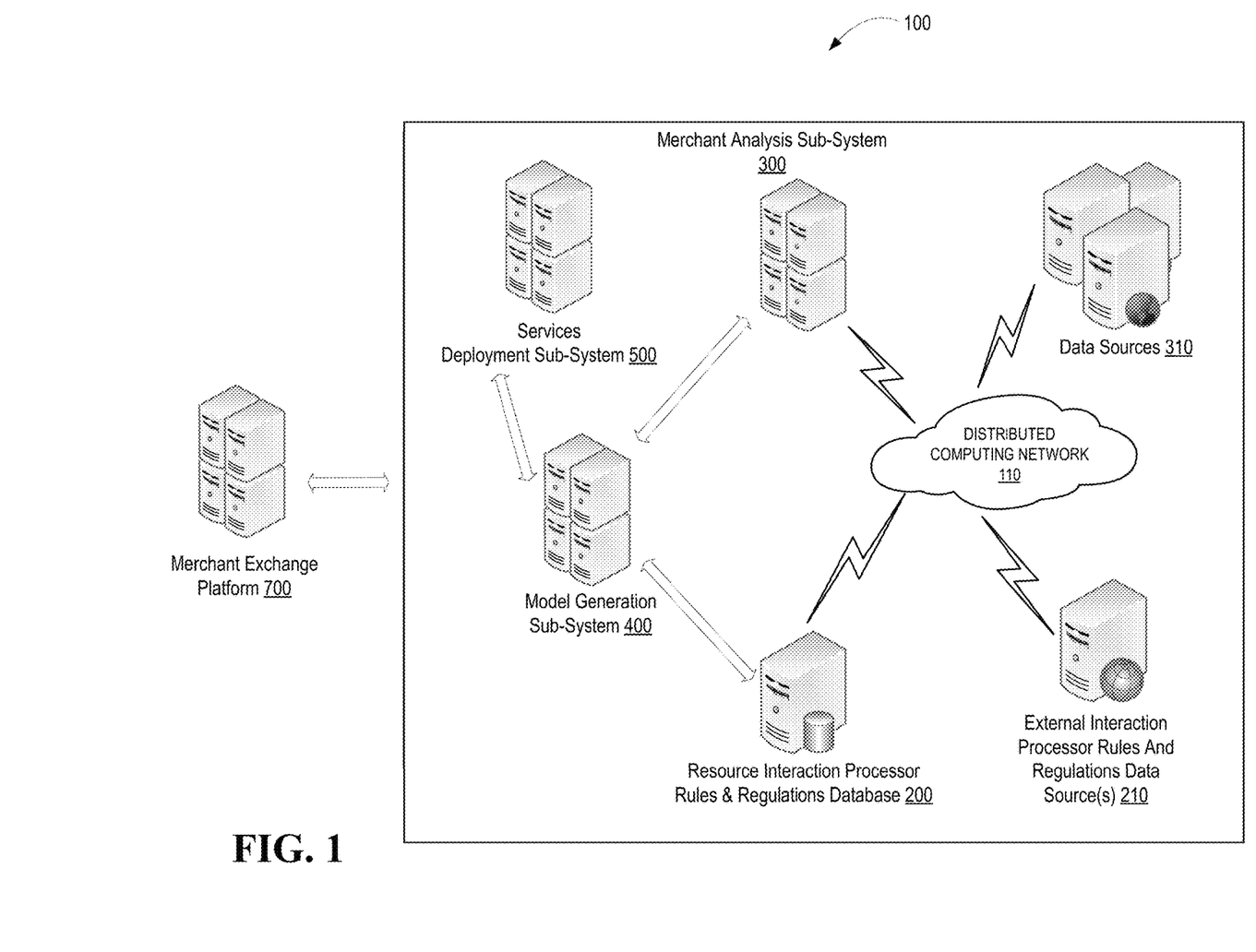
FIG. 1 is a schematic diagram of a system for multi-dimensional modeling of resource interaction processors, in accordance with embodiments of the present invention.

Referring to FIG. 1, a schematic diagram of a system for multi-dimensional modeling of resource interaction processors 100, in accordance with embodiments of the present invention. The system is implemented in a distributed computing network 110, which may include the Internet and one or more intranets or the like. The system 100 includes a resource interaction processor rules and regulations database 200 that is configured to store a plurality of a plurality of both internal and external rules and regulations data associated with a plurality of types of resource interaction processors. Internal rules and regulations are those that are internal to the entity performing the modeling, while external rules and regulations are those mandated by external entities, such as a federal, state or local government or the like. Types of resource interaction processors may indicate the area/space in which the resource interaction processor conducts resource interactions. In specific embodiments in which the resource interaction processor is a merchant, the "type" of merchant may define the industry or the like that the merchant does business in.

In specific embodiments of the invention, the resource interaction processor rules and regulations database 200 is in communication, via distributed communication network 110, with one or more external resource interaction processor rules and regulations data sources 210. In those embodiments of the invention in which the resource interaction processor is a merchant, the external rules and regulations data sources 210 may be government agencies or the like which issue rules and regulations which directly or indirectly pertain to which merchants meet requirements for authorizing the use of merchant services. The rules and regulations database 200 is configured to ensure that the internal and external rules and regulations are up-to-date (i.e., reflect the rules and regulations currently enacted or otherwise in force. As such, the rules and regulations database 200 may be configured to periodically poll the external rules and regulations data sources 210 for any new rules or regulations and/or updates/revisions to existing rules and regulations. In other embodiments of the invention, the external rules and regulations data sources 210 are configured to automatically communicate any new rules and regulations and/or updates/revisions to existing rules and/or regulations upon enactment of such new/revised rules and regulations.

The system 100 additionally includes a merchant analysis sub-system 300 that is configured to capture data associated with the resource interaction processors, aggregate the data and filter the data (i.e., determine which data is acceptable for modeling the resource interaction processor by comparing the value of the data to the misappropriation level associated with the data source). The data is captured or otherwise received from a plurality of external data sources 310. The external data sources 310 may include conventional data sources, such as government agencies, business rating entities or the like and non-conventional data sources, such as social media websites, or other websites that provide advertisements associated with a resource interaction processor, such as, in specific embodiments of the invention, a merchant. Moreover, the non-conventional or alternative data sources may include data source that are only accessible by means of specialized software, such as the "dark web" or the like. In specific embodiments of the invention, the identity of the resource interaction processor is known to the entity performing the modeling and, as such, the capturing of data from the data sources 310 may provide for targeted searches at the data sources 310 and/or scraping of data off of the websites, such as social media sites or web sites that display advertisements for the merchant or the like. In other instances, the entity performing the modeling may be unaware of the identity of the new and or emerging resource interaction processors/merchants. In such embodiments of the invention, the merchant analysis sub-system 300 implements artificial intelligence including, in some instances, machine-learning techniques to identify new/emerging resource interaction processors, e.g., merchants or the like from the data captured from the plurality of data sources 310. Once a new/emerging resource interaction processor/merchant has been identified, sub-system 300 may be configured to monitor the various data sources, such as social media sites and the like, for data associated with the new-emerging resource interaction processor/merchant. Monitoring may include continuously applying keyword searches at the data sources 310 to determine when new data associated with the resource interaction processor is posted on the site or otherwise made available.

Once the data has been captured, the merchant analysis sub-system 300 is configured to aggregate and filter the data as a means of determining which data should be used in the subsequent modeling process. Filtering of the data provides for assessing the value of a datum (i.e., data item) in comparison to the misappropriation level associated with the data source. The misappropriation level associated with the data source indicates the trust associated with the data source (e.g., is the data valid or was the data manipulated to benefit the resource interaction processor, so-called "padded data"). In the event that the data item provides minimal value and/or the misappropriation level associated with the data source exceeds an acceptable level, the datum may be removed from the data set that is subsequently used to perform the resource interaction processor/merchant modeling.

In additional to the aggregation and filtering of the data via the merchant analysis sub-system 300, the various sub-systems are also triggered to provide the data and datum generated at each sub-system, data source, and database to transmit the raw and filtered data to the merchant exchange platform 700.

The system additionally includes a model generating sub-system 400 that is configured to (i) receive, from the merchant analysis sub-system 300, aggregated and filtered data associated with a resource interaction processor/merchant and (ii) access the rules and regulation database to retrieve the internal and/or external rules and regulations applicable to the resource interaction processor/merchant, and (iii) implement a data heuristics engine or the like to generate, based at least on the received data and retrieved rules and regulations, a resource interaction processor/merchant model. The model indicates whether the resource interaction processor/merchant is a viable candidate (e.g., meets rules and regulations and other criteria) for receiving resource interaction/merchant services. In specific embodiments of the invention, the resource interaction processor/merchant model may include a score, which must meet or exceed a threshold score for the resource interaction processor/merchant to be deemed viable or otherwise acceptable for receiving resource interaction processor/merchant services. In this regard, the decisioning process as to whether a resource interaction processor can be offered or otherwise provided resource interaction/merchant services may be a fully automated process or, in other instances, a user may review and approve/disapprove the decision resulting from the modeling process.

The model generation sub-system 400 may transmit valid resource interaction processors to the resource interaction processor services deployment sub-system 500. The resource interaction processor services deployment sub-system 500 is configured to perform actions in response to a resource interaction processor model indicating that the resource interaction processor is a viable candidate or otherwise deemed acceptable for rendering resource interaction processor/merchant services. In specific embodiments of the invention, services deployment sub-system 500 may be configured to automatically deploy services to the resource interaction processor, in response to determining that the resource interaction processor's model indicates that they are a viable candidate. Such deployment of services may include configuring resource interaction processor-specific devices, such as POS device or the like, and providing such devices to the resource interaction processor/merchant. In other embodiments of the invention, a resource interaction processor model indicating that the resource interaction processor is a viable candidate, may trigger the services deployment sub-system to generate and communicate offers to the resource interaction processors/merchant for resource interaction services, such as payment processing services or the like.

The merchant exchange platform 700 may receive the modeling results from the model generation sub-system 400 and the service deployment sub-system 500 to store and identify the modeling generated for the resource interaction processor and the resource interaction services provided to the processor. The merchant exchange platform 700 may continually monitor the services provided and how the processor is performing relative to the services. The merchant exchange platform 700 is further connected to the sub-systems, such as the service deployment sub-system 500, the model generation sub-system, and the merchant analysis sub-system 300 in order to continually receive data, datum, analytics, models, services, and the like generated by the sub-systems. The merchant exchange platform 700 may correlate the information received and encrypt the data. The merchant exchange platform 700 may further provide a graphical user interface for authorized user visualization of the information. Furthermore, the merchant exchange platform 700 comprises analytical analysis software, sentiment analysis software, and artificial intelligence software in order to generate reports about the validity of merchants and merchant categories for the possibility of providing services to those merchants. This may result in report generation, graphical generation, a numerical score output, or the like.

Figure 2:
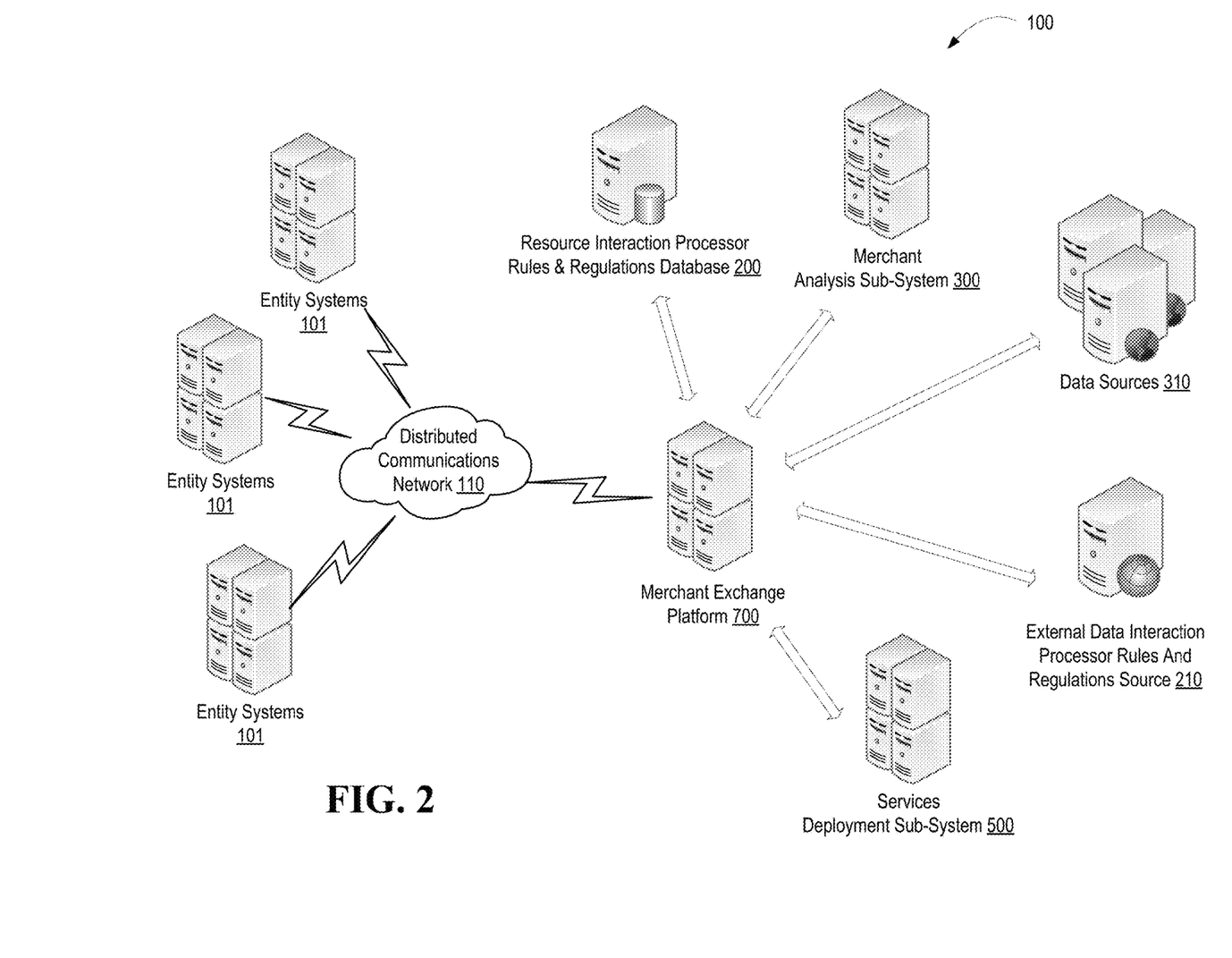
FIG. 2 is a schematic diagram of interaction with the merchant exchange platform for resource interaction processors, in accordance with some embodiments of the present disclosure.

Referring to FIG. 2 a schematic diagram of interaction with the merchant exchange platform for resource interaction processors 100, in accordance with alternate embodiments of the present invention. The system 100 of FIG. 2 provides for additional optional features and/or facets in addition to the features described in relation to FIG. 1. Specifically, FIG. 2 illustrates additional information/data that may be used in the resource interaction processor/merchant platform, as well as, illustrating how the platform communicates with entity systems 101 for distribution of information regarding the resource interaction processor.

In specific embodiments of the invention, system 100 includes multiple sub-systems, databases, and sources. These may include a data analysis sub-system, resource interaction entity processor type analysis sub-system (both not shown, a resource interaction processor rules and regulations database 200, merchant analysis sub-system 300, data sources 310, external data interaction processor rules and regulation sources 210, and service deployment sub-system 500. All of these sub-systems, databases, and sources extract or generate data as described throughout this application. The data extracted or generated is transmitted in real-time to the merchant exchange platform 700.

In specific embodiments of the invention, system 100 includes data analysis sub-systems that capture, aggregate, and filter data associated with entities that conduct or may conduct resource interactions with the resource interaction processor. For example, in specific embodiments of the invention, in which the resource interaction processor is a merchant, the entities are customers or potential customers of the merchant. Entity data analysis sub-system is configured to capture data associated with the resource interaction entities, aggregate the data and filter the data (i.e., determine which data is acceptable for modeling the resource interaction processor by comparing the value of the data to the misappropriation level associated with the data source). The data is captured or otherwise received from a plurality of external data sources 310 and, in some instances, internal data sources. The external data sources 310 may include any publicly accessible data source, such as social media websites or the like that may indicate that the entity is conducts resource interactions with the resource interaction processor/merchant or is contemplating or otherwise desires to conduct a resource interaction with the resource interaction processor/merchant (i.e., is a potential resource interaction entity). In specific embodiments of the invention, the data itself may identify the entity, while in other instances of the invention the identity may be unknown or needs to be confirmed. In such embodiments of the invention, the data analysis sub-system implements artificial intelligence including, in some instances, machine-learning techniques to identify the entities, e.g., customers or the like from the data captured from the plurality of data sources 310. In specific embodiments of the invention, in which the identity of the resource interaction entity has been determined or is otherwise known, the capturing of data from the data sources 310 may provide for targeted searches at the data sources 310 and/or scraping of data off of the websites, such as social media sites or sites that display information associated with the entity (e.g., posts made by the entity on the social media sites or the like). Further, once an entity has been identified, sub-systems may be configured to monitor the various data sources, such as social media sites and the like, for data associated with the entity. Monitoring may include continuously applying keyword searches at the data sources 310 to determine when new data associated with the resource interaction entity is posted on the site or otherwise made available.

Filtering of the data provides for assessing the value of a datum (i.e., data item) and/or entity in comparison to the misappropriation level associated with the data source. In the event that the data item or entity provides minimal value and/or the misappropriation level associated with the data source exceeds an acceptable level, the datum may be removed from the data set that is subsequently used to perform the resource interaction processor/merchant modeling. The value of an entity may be assessed by learning more about the entity. For example, once the identity of the entity is known and/or confirmed, entity data analysis sub-system may determine if the entity/customer is associated with the entity/financial institution performing the resource interaction processor/merchant modeling. For example, determining if the entity/customer is a user/account holder or the like at the financial institution conducting the modeling. If the entity is a user of the entity conducting the resource interaction processor/merchant modeling, the value of the entity may be determined, by accessing internal data sources to determine the volume or fluidity of resources in the entity's accounts and/or the types of transactions that the entity conducts (i.e., transactions similar to transactions conducted by the resource interaction processor/merchant). Once the entity data has been captured, aggregated and filtered, the entity data is received by model generating sub-system 400 and used as a determinative factor in rendering the resource interaction processor/merchant model.

In other specific embodiments of the invention, system 100 includes resource interaction entity processor type analysis sub-system that is configured to capture, aggregate and filter data associated with types of resource interaction processors. In those embodiments of the invention in which the resource interaction processor is a merchant, the types may include industries, sectors or the like to which a specific merchant undergoing modeling is associated with (e.g., the industry in which the merchant conducts transactions or the like). Processor type data analysis sub-system is configured to capture data associated with the type/industry of the resource interaction processor/merchant, aggregate the data and filter the data. The data is captured or otherwise received from a plurality of external data sources 310. It should be noted that the data sources 310 may be the same data sources used to capture data associated with the resource interaction processor and/or entities or the data sources 310 may be different data sources. The data sources 310 may include any publicly accessible data sources, such as business-related websites or the like. Capturing of data from the data sources 310 may provide for targeted searches at the data sources 310 and/or scraping of data off of the websites that display relevant information associated with the type of the resource interaction processor. Further, a sub-system may be configured to monitor the various data sources for data associated with the type of resource interaction processors. Monitoring may include continuously applying keyword searches at the data sources 310 to determine when new data associated with the type of resource interaction processor is posted on the site, stored in a database or otherwise made available.

Once the data has been captured it is aggregated and filtered as a means of determining which data should be used in the platform. Filtering of the data provides for assessing the value of a datum (i.e., data item) in comparison to the misappropriation level associated with the data source. In the event that the data item or entity provides minimal value and/or the misappropriation level associated with the data source exceeds an acceptable level, the datum may be removed from the data set that is subsequently used. Once the resource interaction processor/merchant type/industry data has been captured, aggregated and filtered, the data is received by the merchant exchange platform 700.

It should be note that while data analysis sub-system and processor type data analysis sub-system are described as individual sub-systems, the functionality of these sub-systems may be included in the merchant analysis sub-system 300 or any other comprehensive sub-system.

In specific embodiments of the invention, system 100 includes multiple sub-systems, databases, and sources. These may include a data analysis sub-system, resource interaction entity processor type analysis sub-system (both not shown, a resource interaction processor rules and regulations database 200, merchant analysis sub-system 300, data sources 310, external data interaction processor rules and regulation sources 210, and service deployment subsystem 500. All of these sub-systems, databases, and sources extract or generate data as described throughout this application. The data extracted or generated is transmitted in real-time to the merchant exchange platform 700. The merchant exchange platform 700 may encrypt the data and store the data within the platform. The merchant exchange platform 700 may perform additional analytics on the data and modeling, in order to provide authorized users access to the information for the addition users determination of potentially providing resource interaction processor services to merchants. In this way, the merchant exchange platform 700 may provide information regarding regulatory oversight for the specific merchant, allow for the establishment of a dialogue between merchant and service providers, provide ongoing review of merchant scoring, provides zero knowledge search capabilities, and the like to entity systems 101 via a distributed communications network 110.

Figure 3:
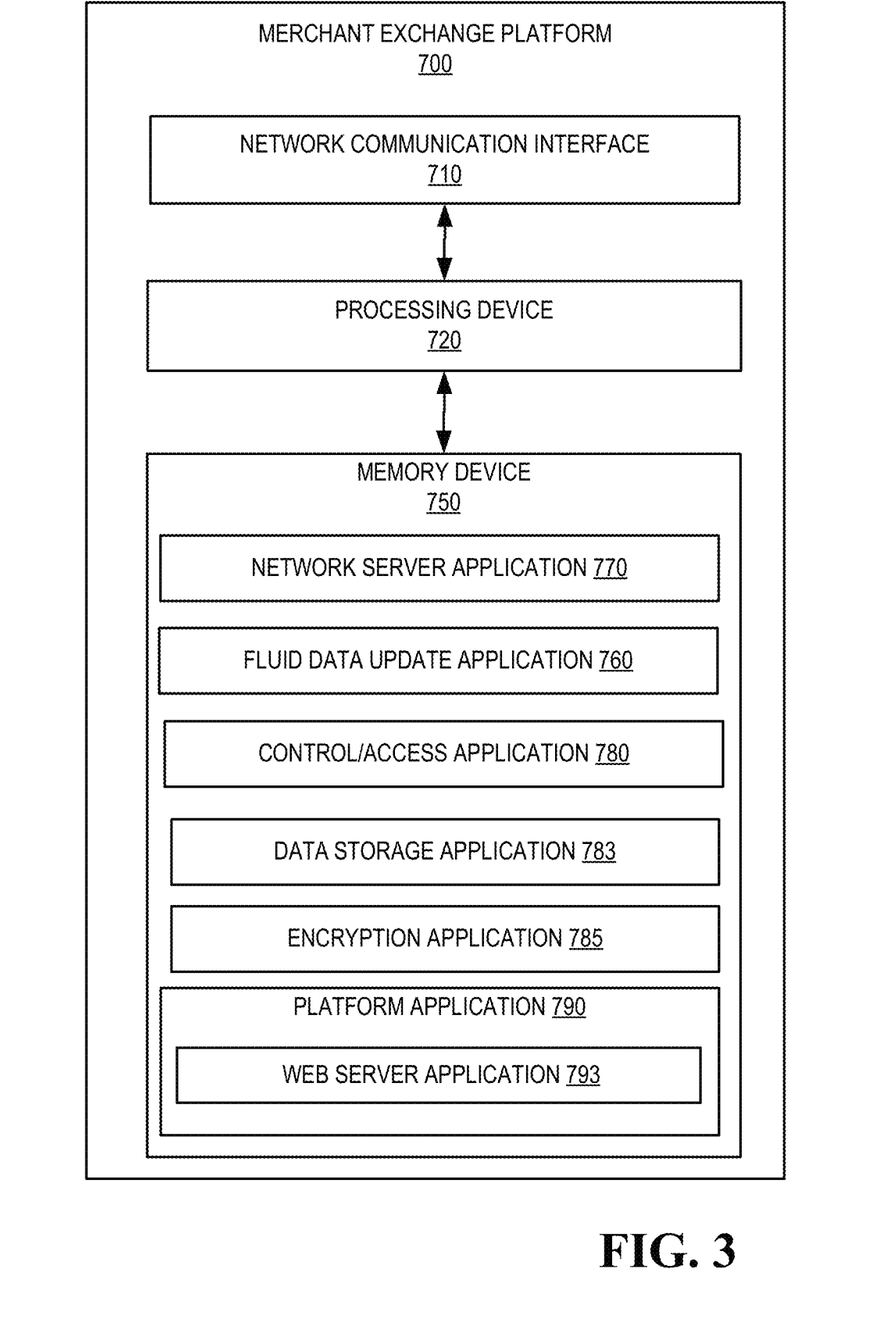
FIG. 3 is a schematic diagram of the merchant exchange platform, in accordance with some embodiments of the present disclosure.

FIG. 3 is a schematic diagram of the merchant exchange platform 700, in accordance with some embodiments of the present disclosure. The merchant exchange platform 700 includes one or more processing devices 720 operatively coupled to a network communication interface 710 and a memory device 750. In certain embodiments, the merchant exchange platform 700 is operated by a financial institution, although the merchant exchange platform 700 may be operated by another entity.

In one embodiment, the merchant exchange platform 700 is part of a financial institution system. It should be understood that the memory device 750 may include one or more applications and one or more databases or other data structures/repositories. The memory device 750 also includes computer-executable program code that instructs the processing device 720 to operate the network communication interface 710 to perform certain communication functions of the merchant exchange platform 700 described herein. For example, in one embodiment of the merchant exchange platform 700, the memory device 750 includes, but is not limited to, a network server application 770, a fluid data update application 760, control/access application 780, a data storage application 783, artificial intelligence engine application, an encryption application 785, and other computer-executable instructions or other data. The computer-executable program code of the network server application 770, a fluid data update application 760, control/access application 780, a data storage application 783, artificial intelligence engine application, an encryption application 785 may instruct the processing device 720 to perform certain logic, data-processing, and data-storing functions of the merchant exchange platform 700 described herein. Furthermore, the merchant exchange platform 700 may include a platform application 790 and a web server application 793 for displaying and communication information on the platform to authorized users.

As used herein, a "communication interface" generally includes a modem, server, transceiver, and/or other device for communicating with other devices on a network. The network communication interface 710 is a communication interface having one or more communication devices configured to communicate with one or more other devices on the network. The processing device 720 is configured to use the network communication interface 710 to transmit and/or receive data and/or commands to and/or from the other devices connected to the network.

Figure 4:
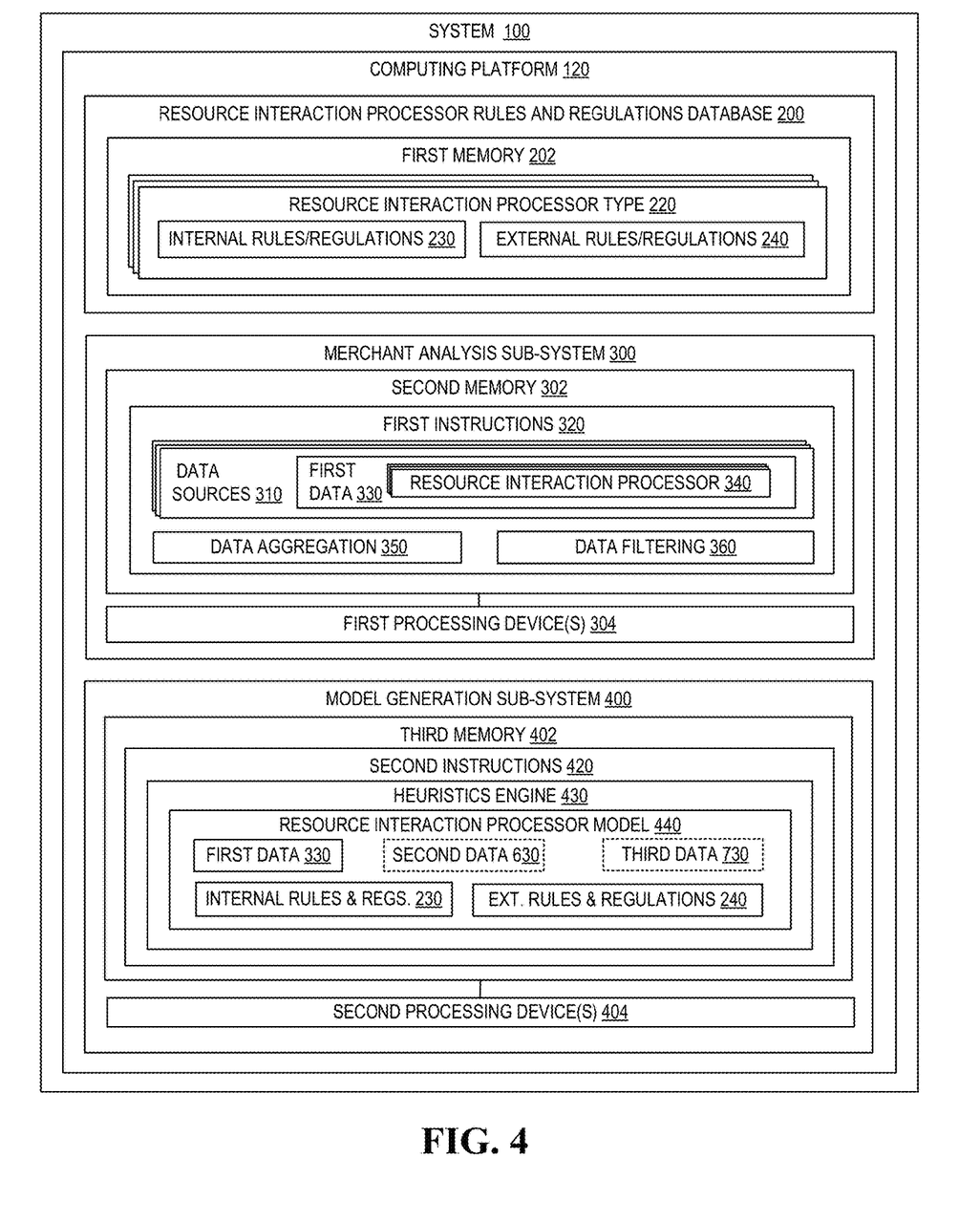
FIGS. 4 and 5 are a block diagram of a system for multi-dimensional modeling of resource interaction processors, in accordance with embodiments of the present invention.
Figure 5:
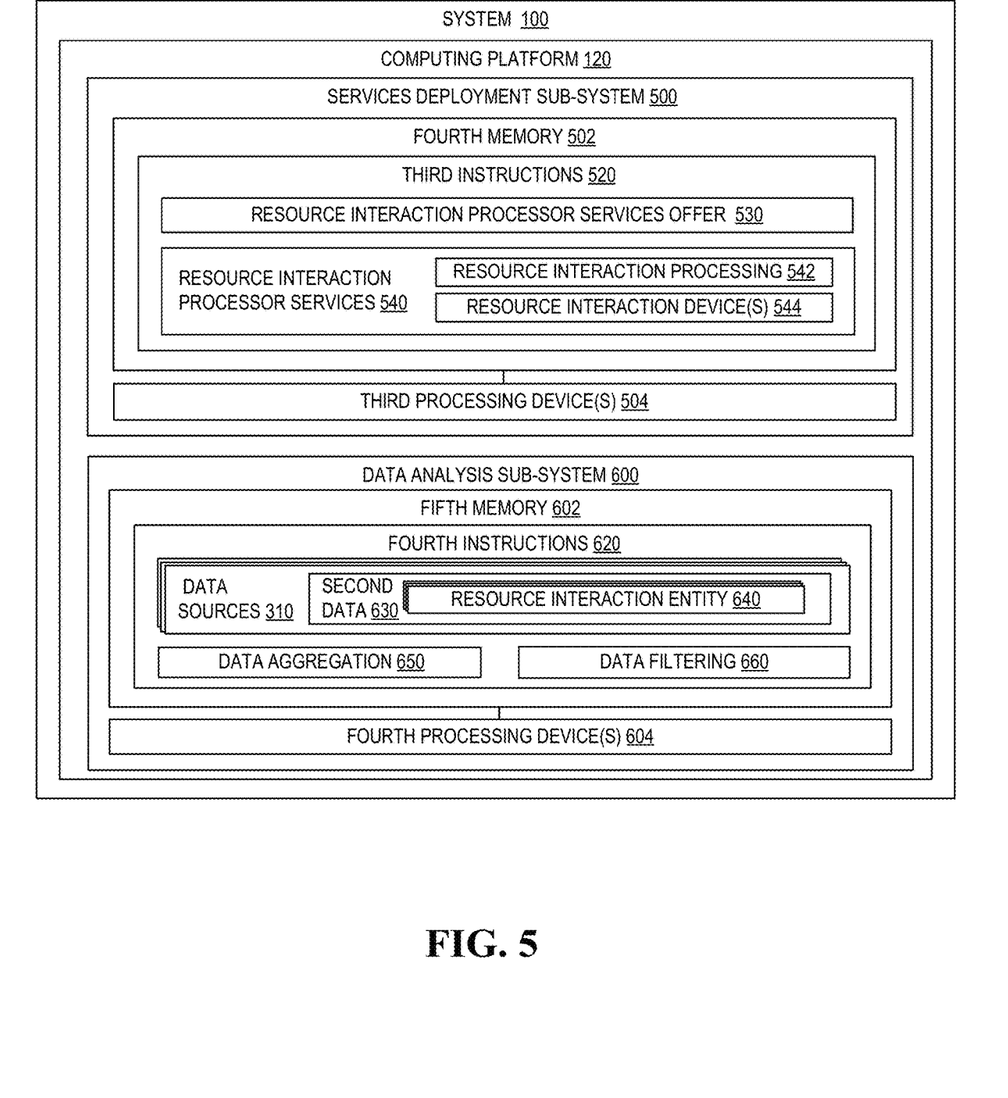

FIGS. 4 and 5 depict a block diagram of a system for multi-dimensional modeling of resource interaction processors, in accordance with various embodiments of the present invention. The includes a computing platform 120, which may comprise one or typically more computing devices (e.g., servers, computing devices, or the like) and is configured to execute instructions, such as algorithms, modules, routines, applications and the like. Computing platform 120 includes memory 202, 302, 402, 502, 602 and the like which may comprise volatile and non-volatile memory, such as read-only and/or random-access memory (RAM and ROM), EPROM, EEPROM, flash cards, or any memory common to computing platforms). Moreover, memory 202, 302, 402, 502, 602 and the like may comprise cloud storage, such as provided by a cloud storage service and/or a cloud connection service.

Further, computing platform 120 also includes at least one processing device 304, 404, 504, 604 or the like which may be an application-specific integrated circuit ("ASIC"), or other chipset, logic circuit, or other data processing device. Processing devices 304, 404, 504, 604 or the like may execute one or more application programming interface (APIs) (not shown in FIGS. 5 or 6) that interface with any resident programs, such as instructions 320, 420, 520, 620 or the like stored in the memory 302, 402, 502, 602 of the computing platform 120 and any external programs. Processing devices 304, 404, 504, 604 may include various processing subsystems embodied in hardware, firmware, software, and combinations thereof, that enable the functionality of the computing platform 120 and the operability of the computing platform 120 on the distributed computing network 110 (shown in FIG. 1). For example, processing subsystems allow for initiating and maintaining communications and exchanging data with other networked devices, such as data sources 310 and external rules and regulations data source 210 (shown in FIG. 1). For the disclosed aspects, processing subsystems of system 100 may include any processing subsystem used in conjunction with the database 200 and various sub-systems 300, 400, 500, 600 of the system 100 and related tools, routines, sub-routines, algorithms, sub-algorithms, sub-modules thereof.

It should be noted that while system 100 is depicted and described as having various sub-systems each having separate instructions, memory and processors, in other embodiments of the invention two or more of the sub-systems and/or the functions within a sub-system may be combined. In this regard, the system 100 may, according to specific embodiments of the invention, include one or more memory, one or more instructions and one or more processing devices.

Computing platform 120 may additionally include a communications module embodied in hardware, firmware, software, and combinations thereof, that enables electronic communications between the computing platform 120 and other network devices, such as data sources 310 and/or external rules and regulations data source 210 (shown in FIG. 1). Thus, a communications module may include the requisite hardware, firmware, software and/or combinations thereof for establishing and maintaining a network communication connection with one or more network devices.

Computing platform 120 includes resource interaction processing rules and regulations database 200, which stores, in first memory 202, internal rules and regulations 230 and external rules and regulations 240 associated with specific resource interaction processor types 220. In those embodiments of the invention, in which the resource interaction processor 340 is a merchant, the internal and external rules and regulations 230 and 240 are associated with specific merchant types (e.g., specific industries or the like). As previously noted, the internal rules and regulations 230 are associated with the entity conducting the resource interaction processor modeling process, while external rules and regulations are associated with government agencies (e.g., federal, state, local or the like) or the like. Since, new or revised internal and external rules and regulations 230, 240 may be constantly generated, the 200 is configured to in network communication with both internal rules and regulation sources and external rules and regulations sources as a means of insuring that the rules and regulations in database 200 reflect the currently enforce rules and regulations.

Computing platform 120 additionally includes 300, which stores, in second memory 302, first instructions 320 that are executable by first processing device(s) 304. The first instructions 320 are configured to capture first data 330 from a plurality of data sources 310. The first data 330 is data associated with or otherwise pertaining to resource interaction processors. The data sources 310 may be any publicly accessible network site, such as social media sites, sites that provide advertisements or the like and/or privately accessible network sites, such as the "dark web" or the like. In those instances in which the identity of a resource interaction processor is known, first instructions 320 may be configured to continuously monitor, or poll on a predetermined interval, the data sources 310 for the appearance of keywords related to a specific resource interaction processor and, in response to the appearance of one of the keywords at the data source 310, the instructions 320 may provide for capturing the data item that includes the keyword. In other instances in which the identity of the resource interaction processor is not known, first instructions 320 may be configured to continuously monitor, or poll on a predetermined interval, the data sources 310 for the appearance of generic keywords that indicate a resource interaction processor and, in response to the appearance of one of the keywords at the data source 310, the instructions 320 may provide for capturing the data item that includes the keyword.

In response to capturing the first data 330, the first data 330 is aggregated and filtered. Data aggregation 350 provides for grouping data according to a specific resource interaction processor. In those embodiments of the invention in which the identity of the resource interaction processor is unknown, a distributed trust computing network may be implemented as a source of truth for verifying/confirming the identity and/or location of a resource interaction processor. The identity verification/confirmation process may occur prior to data aggregation 350 and/or data filtering 360.

Data filtering 360 ensures that only data of value from trustworthy data sources is incorporated into the subsequent modeling process. In this regard, data filtering 360 includes analyzing a value of first datum in comparison to trust levels associated with each of the data sources and removing at least a portion of the first data determined to have the value below a predetermined one of the trust levels. Moreover, data filtering is implemented to remove data items that are redundant and/or data items that are viewed as manipulative (e.g., data items that have been strategically placed at a data source 310 for the purpose of increasing user favorability of the resource interaction processor or the like).

Computing platform 120 additionally includes model generating sub-system 400, which stores, in third memory 402, second instructions 420 that are executable by second processing device(s) 404. The second instructions 420 are configured to execute a modeling process for individual ones of the resource interaction processors. In this regard, second instructions 420 are configured to receive the aggregated and filtered first data 330 from the merchant analysis sub-system 300 and access the database 200 to retrieve internal rules and regulations 230 and external rules and regulations 240 applicable to the resource interaction processor (i.e., applicable to the type of resource interaction processor that the specific resource interaction processor is associated with).

In response, the second instructions 420 are configured to implement a heuristics engine to 430 generate a resource interaction processor model 440 for the resource interaction processor based at least on the first data 330 and the internal and external rules and regulations 230 and 240. The resource interaction processor model defines whether the resource interaction processors is a viable candidate for deploying resource interaction processor services. In specific embodiments of the invention the model includes a score indicative of the viability of the resource interaction processor as a candidate for resource interaction services. In such embodiments the score may be compared to a threshold score to determine if the resource interaction processor meets the criteria for being offered or otherwise deploying resource interaction processor services.

Referring to FIG. 5, alternate/optional sub-systems 500 and 600 of system 100 are depicted and herein described, in accordance with optional embodiments of the invention. Computing platform 120 optionally includes resource interaction processor services deployment sub-system 500, which stores, in second memory 502, third instructions 520 that are executable by third processing device(s) 504. The third instructions 520 are configured to, in response to determining that the one of the plurality of resource interaction processors is the viable candidate, perform a resource service deployment action. The resource service deployment action may include generating and initiating communication of resource interaction processor service offers to the resource interaction processor. In those embodiments of the invention in which the resource interaction processor is a merchant, the sub-system 500 generates and initiates communication of merchant services offers to the merchant. In other embodiments of the invention, the resource service deployment action may include automatically deploying resource interaction processor services 540 to the resource interaction processor 340. Such services 540 may include, but are not limited to, resource interaction processing 542 (e.g., payment processing services) and/or resource interaction devices 544, which may be specific to the resource interaction processor (e.g., Point-Of-Sale (POS) devices or the like, which may be customized based on the needs of the merchant).

Computing platform 120 additionally includes data analysis sub-system 600, which stores, in fifth memory 602, fourth instructions 620 that are executable by fourth processing device(s) 604. The fourth instructions 620 are configured to capture second data 630 from a plurality of data sources 310. The data sources 310 may be the same data sources used to capture first data 330 or different data sources. The second data 630 is data associated with or otherwise pertaining to resource interaction entities 640, which in those embodiments of the invention in which the resource interaction processor is a merchant, the entities include existing or potential customers of the merchant. The data sources 310 may be any publicly accessible network site, such as social media sites or the like. Additionally, the data sources 310 may be internal to the entity providing the modeling, such as financial transaction/account databases that show that the customer has conducted transactions with a merchant.

In response to capturing the second data 630, the second data 630 is aggregated and filtered. Data aggregation 650 provides for grouping data according to a specific resource interaction entity 640 and the resource interaction processor 340 associated with the entity 640. Data filtering 660 ensures that only data of value from trustworthy data sources is incorporated into the subsequent modeling process. In this regard, data filtering 360 includes analyzing a value of second datum in comparison to trust levels associated with each of the data sources and removing at least a portion of the second data 630 determined to have a value below a predetermined one of the trust levels. Moreover, data filtering is implemented to remove data items that are redundant and/or data items that are viewed as manipulative (e.g., data items that have been strategically placed at a data source 310 for the purpose of increasing user favorability of the resource interaction processor 340 or the like). Subsequently, the aggregated and filtered second data 630 may, in specific embodiments of the invention, be used by the heuristics engine 430 of the model generating sub-system 400 to generate the resource interaction processor model 440.

Computing platform 120 additionally includes processor type data analysis sub-system 701, which stores, in sixth memory 702, fifth instructions 720 that are executable by fifth processing device(s) 704. The fifth instructions 720 are configured to capture third data 730 from a plurality of data sources 310. The data sources 310 may be the same data sources used to capture first data 330 or different data sources. The third data 730 is data associated with or otherwise pertaining to resource interaction processor types 740, which in those embodiments of the invention in which the resource interaction processor is a merchant, the entities include industries or other grouping/sectors of merchants. The data sources 310 may be any publicly accessible network site.

In response to capturing the third data 730, the third data 730 is aggregated and filtered. Data aggregation 750 provides for grouping data according to a specific resource interaction processor 340 undergoing modeling. Data filtering 760 ensures that only data of value from trustworthy data sources is incorporated into the subsequent modeling process. In this regard, data filtering 360 includes analyzing a value of third datum in comparison to trust levels associated with each of the data sources and removing at least a portion of the second data 630 determined to have a value below a predetermined one of the trust levels. Moreover, data filtering is implemented to remove data items that are redundant. Subsequently, the aggregated and filtered third data 730 may, in specific embodiments of the invention, be used by the heuristics engine 430 of the model generating sub-system 400 to generate the resource interaction processor model 440.

All of the systems described in FIG. 4 and FIG. 5 furthermore comprise communication applications for the communication of data and analytics to the merchant exchange platform 700, further described above.

Figure 6:
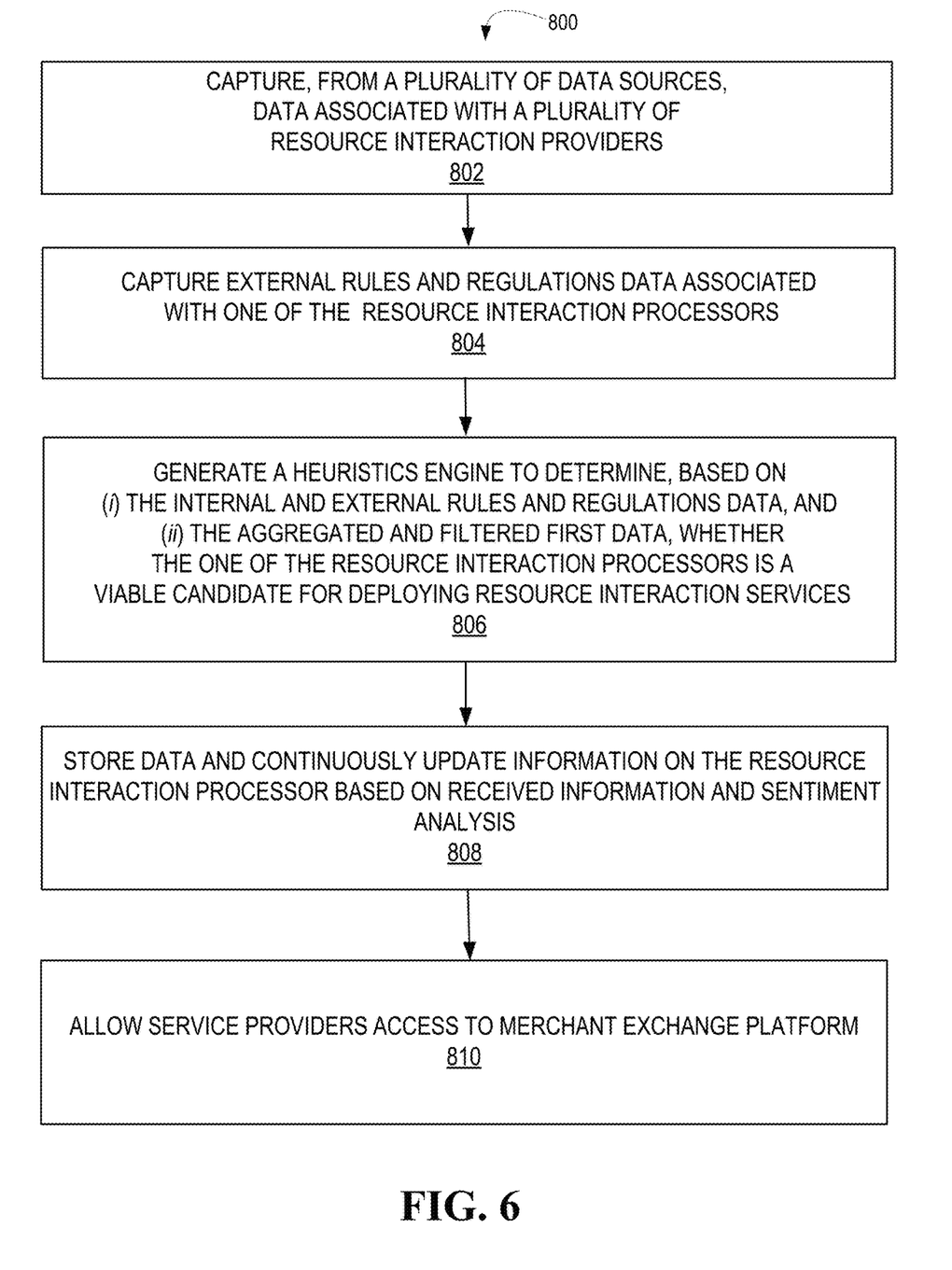
FIG. 6 is flow diagram of a method for generating the merchant exchange platform, in accordance with embodiments of the present invention.

FIG. 6 is flow diagram of a method for generating the merchant exchange platform 800, in accordance with embodiments of the present invention. As illustrated in block 802, the process 800 is initiated by capturing, from a plurality of data sources, data associated with a plurality of resource interaction providers. In specific embodiments of the invention, the resource interaction processors are merchants and, specifically prospective merchants that may desire merchant services. The data sources may be external data sources, accessible via the Internet or the like and may include conventional and non-conventional data sources including publicly accessible and privately accessible data sources. Additionally, the data sources may be internal data sources, accessible via an intranet or the like. The data may be captured by continuously monitoring, or polling on a regularly prescribed interval, the data sources for first data associated with resource interaction processors.

The captured data can then be aggregated and filtered. Data aggregation provides for the data to grouped or otherwise organized according specific ones of the resource interaction processors. Data filtering provides for removing datum that has minimal value and/or is captured from an untrusted data source. Further, data filtering serves to remove redundant data and/or data that have been manipulated in favor of the resource interaction processor (i.e., so-called padded data or the like).

Next, as illustrated in block 804, the process 800 continues by retrieving internal and/or external rules and regulations applicable to the resource interaction processor. Specifically, the internal and/or external rules and regulations that are retrieved are associated with the designated type (e.g., industry, sector or the like) of resource interaction processor.

As illustrated in block 806, a heuristics engine is implemented to determine whether one of the resource interaction processor, based at least on the aggregated and filtered first data and the internal and/or external rules and regulations, is a viable candidate for deploying resource interaction services. In this way, the heuristic engine generates a model for the merchant that indicates whether the resource interaction processor is a viable candidate for deploying resource interaction services. In specific embodiments of the method, the model may include or consist of a score, which is compared to a threshold service deployment score for determining whether the resource interaction processor is a viable candidate for service deployment.

Next, as illustrated in block 808, the process 800 continues by storing the data and analytics and continuously update the information on the resource interaction processors based on received information and analysis. In this way, the merchant exchange platform may be able store the extracted or gathered information about the merchant and/or the merchant category. Finally, as illustrated in block 810, the process 800 is completed by allowing for service providers to access the merchant exchange platform for searching of the merchant or a category of merchant for providing possible resource interaction processor services to the merchant.

Figure 7:
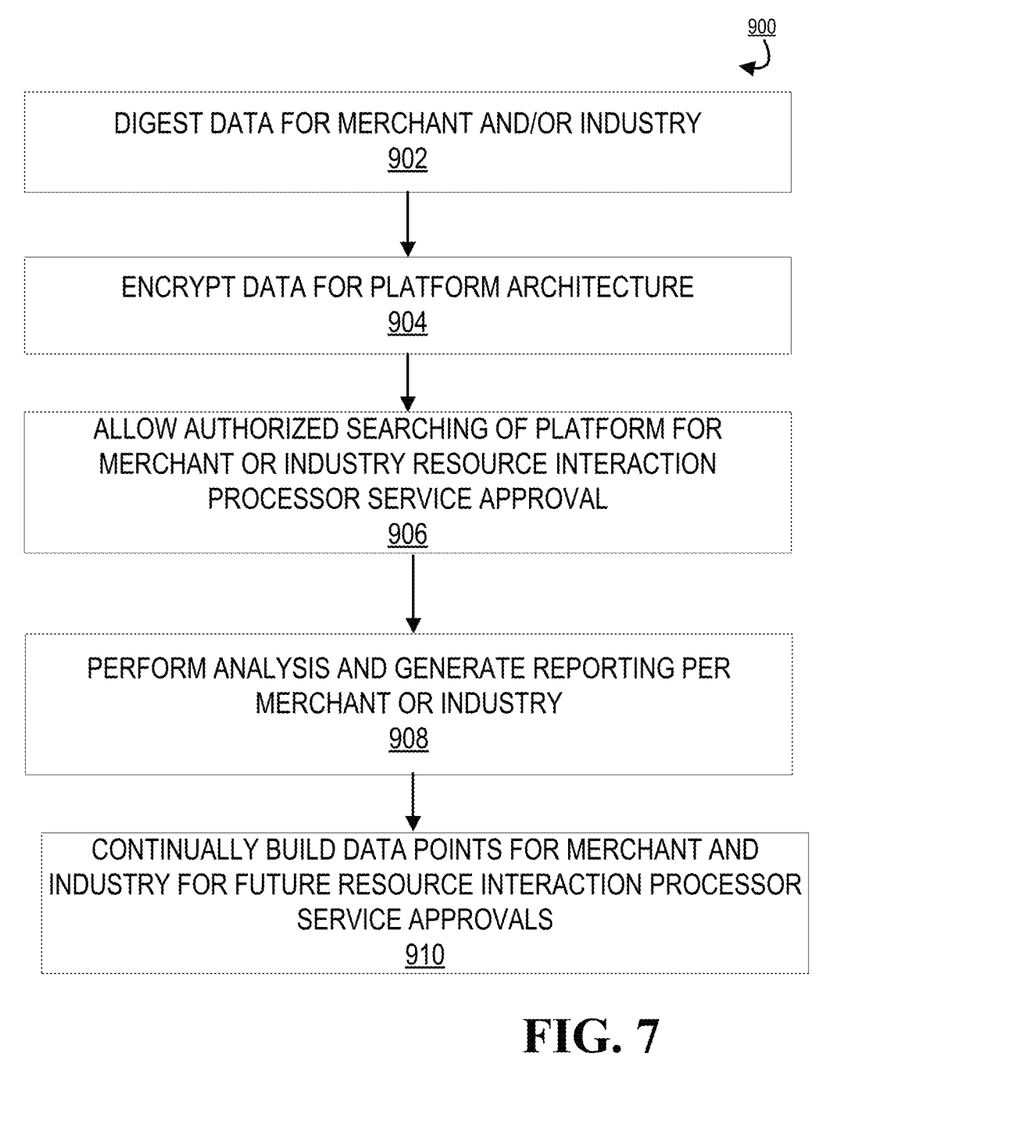
FIG. 7 is flow diagram of a method for utilization of the merchant exchange platform, in accordance with embodiments of the present invention.

FIG. 7 is flow diagram of a method for utilization of the merchant exchange platform 900, in accordance with embodiments of the present invention. As illustrated in block 902, the process 900 is initiated by digesting data for the merchant and/or the merchant industry or category of merchant. This includes all of the analysis, data, datum, modeling, and the like identified by the various sources and sub-systems outlined in detail about. Next, as illustrated in block 904, the process 900 continues by encrypting the data and modeling received at the platform for the platform architecture. At this point, the data is secured and only accessible on the merchant exchange platform by authorized users.

As illustrated in block 906, the process 900 continues by allowing for authorized searching of the merchant exchange platform for merchant or industry resource interaction processor service approval. The authorized users may be entities or users that may provide resource interaction processor services to the merchants. The merchant exchange platform may further perform additional analysis on the data received and generate reporting per merchant or industry based on request, as illustrated in block 908.

Finally, as illustrated in block 910, the process 900 is completed by continually build data points for merchant and industry for future resource interaction processing service approvals.

Embodiments of the present invention address the above needs and/or achieve other advantages by providing an exchange platform for merchants that qualify under a modelling process. The platform is continuously updated with information regarding the merchant with both private and public information. The platform includes regulatory and other rules dictating business parameters associated with the merchant. The platform may develop various scoring methods associated with a merchant for scoring the merchant and merchant category for possible resource interaction processor services deployment from a financial institution or other entities. The platform provides a rating or viability metric of the merchant for providing resource interaction processor services to the merchant. Other entities may access and view the merchant exchange platform to gather information about the merchant for use in determining whether to provide services. Furthermore, the platform provides information regarding regulatory oversight for the specific merchant, allows for the establishment of a dialogue between merchant and service providers, provides ongoing review of merchant scoring, provides zero knowledge search capabilities, and the like within the platform.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-dimensional platform generation for resource interaction processors, the system comprising:
   a resource interaction exchange platform configured to store a plurality of internal and external data associated with a plurality of types of resource interaction processors;
   a memory device with computer-readable program code stored thereon;
   a communication device, wherein the communication device is configured to establish operative communication with a plurality of networked devices via a communication network;
   a resource interaction processing device operatively coupled to the resource interaction platform, memory device, and the communication device, wherein the processing device is configured to execute the computer-readable program code to:
      capture, from a plurality of internal and external resource interaction processor data sources, data associated with a plurality of resource interaction processors;
      aggregate the captured data;
      filter the captured and aggregated data, wherein filtering the captured and aggregated data further comprises removing data captured from untrusted data sources and removing manipulated data;
      access a rules and regulations database to retrieve internal and external rules and regulations data associated with one of the plurality of resource interaction processors;
      implement a heuristics engine to determine, based at least on the retrieved internal and external rules and regulations data, the captured, aggregated, and filtered data, that the resource interaction processor is a viable candidate for deploying resource interaction processor services, wherein the determining generates a model for resource interaction processor viability;
      encrypt resource interaction processor information for authorized user access;
      present the encrypted resource interaction processor information to authorized users for resource interaction processor service deployment; and
      allow access to the multi-dimensional platform to the resource interaction processor that is a viable candidate for deploying resource interaction processor services and an interaction processor service provider, wherein the multi-dimensional platform allows access to resource interaction processor information for service determination, resource interaction processor category regulatory oversight, and communication connections between the resource interaction processor and an additional interaction processor service provider.

2. The system of claim 1, further comprising providing a dynamic viability metric for the resource interaction processor.

3. The system of claim 1, further comprising establishment of a dialogue between the authorized users and a plurality of resource interaction providers via a distributed computer network.

4. The system of claim 1, further comprising a model generating sub-system configure to:
   receive, from the resource interaction processor, captured, aggregated, and filtered data associated with the one of the plurality of resource interaction processors; and
   access a resource interaction processor database to retrieve internal and external rules and regulations data associated with one of the plurality of resource interaction processors to implement the heuristics engine.

5. The system of claim 1, further comprising filtering the captured and aggregated data by analyzing a value of first datum in comparison to trust levels associated with each of the data sources and removing at least a portion of the data determined to have the value below a predetermined one of the trust levels.

6. The system of claim 1, further comprising in response to determining that the resource interaction processor is the viable candidate, deploy one or more resource interaction processor services to the resource interaction processor.

7. A computer program product for multi-dimensional platform generation for resource interaction processors, the computer program product comprising at least one non-transitory computer-readable medium having computer-readable program code portions embodied therein, the computer-readable program code portions comprising:
   an executable portion configured for capturing, from a plurality of internal and external resource interaction processor data sources, data associated with a plurality of resource interaction processors;
   an executable portion configured for aggregating the captured data;
   an executable portion configured for filtering the captured and aggregated data, wherein filtering the captured and aggregated data further comprises removing data captured from untrusted data sources and removing manipulated data;
   an executable portion configured for accessing a rules and regulations database to retrieve internal and external rules and regulations data associated with one of the plurality of resource interaction processors;
   an executable portion configured for implementing a heuristics engine to determine, based at least on the retrieved internal and external rules and regulations data, the captured, aggregated, and filtered data, that the resource interaction processor is a viable candidate for deploying resource interaction processor services, wherein the determining generates a model for resource interaction processor viability;
   an executable portion configured for encrypting resource interaction processor information for authorized user access;
   an executable portion configured for presenting the encrypted resource interaction processor information to authorized users for resource interaction processor service deployment; and
   an executable portion configured for allowing access to the multi-dimensional platform to resource interaction processor that is a viable candidate for deploying resource interaction processor services and an interaction processor service provider, wherein the multi-dimensional platform allows access to resource interaction processor information for service determination, resource interaction processor category regulatory oversight, and communication connections between the resource interaction processor and an additional interaction processor service provider.

8. The computer program product of claim 7, further comprising an executable portion configured for providing a dynamic viability metric for the resource interaction processor.

9. The computer program product of claim 7, further comprising an executable portion configured for establishment of a dialogue between the authorized users and a plurality of resource interaction providers via a distributed computer network.

10. The computer program product of claim 7, further comprising an executable portion configured for:
receiving, from the resource interaction processor, captured, aggregated, and filtered data associated with the one of the plurality of resource interaction processors; and
accessing a resource interaction processor database to retrieve internal and external rules and regulations data associated with one of the plurality of resource interaction processors to implement the heuristics engine.

11. The computer program product of claim 7, further comprising an executable portion configured for filtering the captured and aggregated data by analyzing a value of first datum in comparison to trust levels associated with each of the data sources and removing at least a portion of the data determined to have the value below a predetermined one of the trust levels.

12. The computer program product of claim 7, further comprising in response to determining that the resource interaction processor is the viable candidate, an executable portion configured for deploying one or more resource interaction processor services to the resource interaction processor.

13. A computer-implemented method for providing multi-dimensional platform generation for resource interaction processors, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
capturing, from a plurality of internal and external resource interaction processor data sources, data associated with a plurality of resource interaction processors;
aggregating the captured data;
filtering the captured and aggregated data, wherein filtering the captured and aggregated data further comprises removing data captured from untrusted data sources and removing manipulated data;
accessing a rules and regulations database to retrieve internal and external rules and regulations data associated with one of the plurality of resource interaction processors;
implementing a heuristics engine to determine, based at least on the retrieved internal and external rules and regulations data, the captured, aggregated, and filtered data, that the resource interaction processor is a viable candidate for deploying resource interaction processor services, wherein the determining generates a model for resource interaction processor viability;
encrypting resource interaction processor information for authorized user access;
presenting the encrypted resource interaction processor information to authorized users for resource interaction processor service deployment; and
allowing access to the multi-dimensional platform to the resource interaction processor that is a viable candidate for deploying resource interaction processor services and an interaction processor service provider, wherein the multi-dimensional platform allows access to merchant information for service determination, merchant category regulatory oversight, and communication connections between a merchant and an additional interaction processor service provider.

14. The computer-implemented method of claim 13, further comprising providing a dynamic viability metric for the resource interaction processor.

15. The computer-implemented method of claim 13, further comprising establishment of a dialogue between the authorized users and a plurality of resource interaction providers via a distributed computer network.

16. The computer-implemented method of claim 13, further comprising filtering the captured and aggregated data by analyzing a value of first datum in comparison to trust levels associated with each of the data sources and removing at least a portion of the data determined to have the value below a predetermined one of the trust levels.

17. The computer-implemented method of claim 13, further comprising in response to determining that the resource interaction processor is the viable candidate, deploy one or more resource interaction processor services to the resource interaction processor.

* * * * *